Patented July 27, 1954

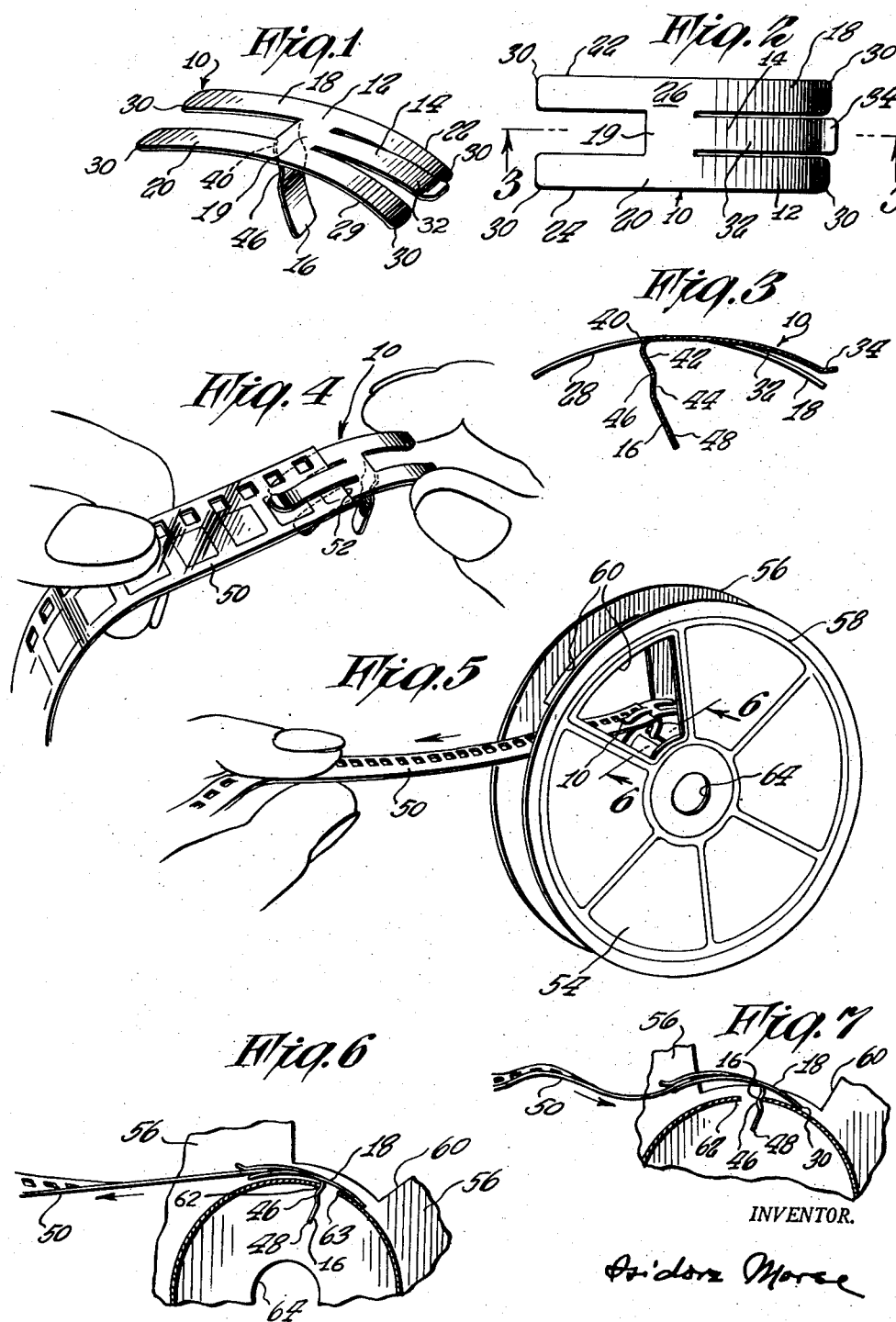

2,684,814

UNITED STATES PATENT OFFICE 2,684,814

MEANS FOR ENGAGING MOTION-PICTURE FILM ENDS

Isidore Morse, Bronx, N. Y.

Application February 19, 1951, Serial No. 211,710

6 Claims. (Cl. 242—74)

This invention pertains generally to motion pictures, and more particularly to a novel means for securing the terminals of strips of motion picture films to the central core of a reel whereby the former may be spooled upon the latter.

When using films of professional or 35 mm. sizes of film, the spool upon which the films are wound normally has flanges which are spaced apart a distance sufficient to permit the insertion of thumb and forefinger of a user without difficulty. The engagement of the end of the film with the slot has therefore been a relatively simple matter. When amateur motion picture photography first became popular the film size employed was reduced to 16 mm. in width. While spooling these films is not as convenient an operation as the spooling of the 35 mm. size, it is nevertheless still possible to insert the fingers between the flanges which form a part of the reel whereby the film end may be manually engaged with the slot in the core of the reel. In recent years the most popular film size has been the 8 mm. width, commonly known as the "double 8", in which the film is 16 mm. in width when loaded into the motion picture camera, and 8 mm. in width when returned from the processing procedure in condition for projection. Since the projection reels are equipped with flanges which are spaced from each other a distance only slightly greater than 8 mm. it is impossible for the user to insert his fingers between these flanges to facilitate the engagement of the end of the film strip with the upper core of the reel. Further, once engaged the strip may very easily disengage itself owing to the fact that there is no mechanical means maintaining the engagement.

It is therefore among the principal objects of the present invention to provide a novel means in the form of a clip which is easily engageable with both the end of a strip of film and the slot present in the standard type of film reel.

Another object of the invention herein lies in the provision of film clip structure in which the engagement of a portion of the same with the terminal of a strip of film is of a positive resilient nature and of such type and of such structure as to permit a ready engagement and disengagement therewith.

A further object of the invention herein lies in the provision of film clip means engageable with both the terminal of a strip of film and the corresponding central slot in the core of a film reel in which, while the engagement of the same with the slot in the reel may be simply accomplished, accidental disengagement may be prevented by means incorporated therein.

Another object of the invention herein lies in the provision of structure of the class described which will occupy a minimum amount of space when positioned upon a reel, so as not to affect the total footage capacity of the reel.

Still another object of the invention herein lies in the provision of means for engaging film ends with a reel therefor in which the cost of fabrication may be of a relatively low order, with consequent wide sale, distribution and use.

A feature of the invention lies in the fact that the entire device may be formed from a single stamping from planar metallic stock. It is contemplated that the means need cost but very little more to manufacture than the conventional paper clip.

Another feature of the invention lies in the fact that the device may be shaped so as to conform to the outer surface of the core of the reel, so as to automatically properly position the end of the film upon the reel without actually threading the end of the film through the slot thereof.

These objects and features, as well as other incidental ends and advantages, will become more clearly apparent during the course of the following disclosure, and be pointed out in the appended claims.

On the drawings, to which reference will be made in the disclosure, similar reference characters have been employed to designate corresponding parts throughout the several views.

Figure 1 is a view in perspective showing an embodiment of the invention.

Figure 2 is a plan view of the embodiment.

Figure 3 is a central vertical longitudinal sectional view as seen from the plane 3—3 on Figure 2.

Figure 4 is a view in perspective showing the method of engaging the device with a free end of a strip of film to be subsequently threaded upon a reel.

Figure 5 is a view in perspective showing the actual engagement of the film with the central or core portion of the reel.

Figure 6 is an enlarged fragmentary vertical central sectional view as seen from the plane 6—6 on Figure 5

Figure 7 is an enlarged vertical central sectional view corresponding to that seen upon Figure 6, but showing a relationship of parts which occurs when tension upon a strip of film is accidentally or intentionally slackened.

In accordance with the invention, the device, generally indicated by reference character 10, comprises broadly: a main body element 12, a film clip element 14 and a reel engagement element 16.

As has been mentioned, the device 10 is preferably formed from a single stamping from planar metallic stock. If desired, however, the same may be cast from synthetic resins by injection or formed from wire stock in a manner not unlike the formation of a paper clip. Although I have shown the device in use in conjunction with film and reels of the 8 mm. type, it will, of course, be understood by those skilled in the art that the scope of the invention encompasses applications to the 16 mm. and 35 mm. sizes as well. In such cases, the sizes of the various parts comprising the device will be proportionately enlarged to either twice or four times the size indicated on the drawings.

The main body element 12 is adapted to be positioned upon the outer surface of the core of a reel and includes a pair of alignment members 18 and 20 fixedly spaced in mutually parallel relationship by a connecting member 19. The outer edges 22 and 24 of the alignment members 18 and 20, respectively, are spaced from each other a distance sufficient to allow them to abut the inner surfaces of the flanges of a conventional reel. Thus in the particular application shown, this distance will be very slightly less than 8 mm. The main body element 12, as may be seen on Figures 1 and 3, has a curved overall configuration wherein the outer surface 26 is generally convex, while the inner surface 28 is generally concave. Since the element 12 will lie upon the outer surface of the core of a film reel, the radius of curvature of the element 12 is substantially equal to that of the core. To prevent accidental damage to the film in motion or injury to the used when applying the device 10 all sharp edges which occur at the corners 30 are rounded.

The film clip element 14 serves to engage the device with the end of a strip of film, generally indicated by reference character 50. It includes a tension member 32 and an end portion or leading edge 34 which is bent outward slightly to facilitate the engagement of the film. Referring to Figure 3, the member 32 is normally resiliently urged in a downwardly direction, relative to the main body element 12, and coacts with portions of the alignment members 18 and 20 to provide sufficient tension upon the film 50. As may be seen on Figure 4, the film is inserted such that the surfaces thereof will contact the lower surface of the tension member 32 and the outer surface 26 of the element 12.

The reel engagement element 16 is formed by bending downwardly as seen on Figure 3 a tab of metal formed during the stamping process. It is of irregular configuration, including an angled portion 40, recess forming portions 42 and 44, which define the recess 46, and a leading edge or guide portion 48. As may be seen on Figures 1 and 3, the apex of the recess 46 faces toward the end of the device at which the film 50 is attached. The angled portion 40 preferably includes a degree of arc greater than 90°, in order that when tension is exerted upon the film 50 the tendency will be for the engagement of the element 16 with the slot on the reel to become more secure rather than less secure.

The employment of the means may be best understood by an examination of Figures 4 to 7, inclusive. The film 50 is grasped between the fingers of one hand at a point near the terminal thereof, while the device 10 is grasped between the fingers of the other hand of the user. The end of the film is then threaded between the alignment members 18 and 20 in the tension member 32, this engagement being facilitated by the camming action of the curved end portion 34 which extends upwardly from the plane of the tension member 32. The film is pushed inwardly against the tension member 32 until the edge 52 is firmly seated, after which the device is ready for engagement upon a standard reel indicated by reference character 54. The reel 54 is preferably held so that the openings 60 in the flanges 56 and 58 are facing generally upwardly, since this orientation will also position the slot edges 62 and 63 upwardly to receive the reel engagement element 16. A portion of the film 52 is then dropped between the flanges 56 and 58, and drawn outwardly as indicated by the direction of the arrow on Figure 5 until the leading or guide portion 48 drops into the slot formed by the edges 62 and 63. This condition is shown on Figure 6, wherein the end of the film 52 is accurately engaged with the reel 54. The reel may be then engaged with the projector, and the film rewound thereupon. Should accidentally the tension on the strip of film 50 be relaxed so as to permit the film to buckle as shown on Figure 7, the device 10 will not become easily disengaged from within the slot. Rather, the edge 48 will in most cases slip into the recess 46, causing the nearer edges 30 to contact the outer surface of the core of the reel, at which point further disengagement is arrested. The device 10 can, of course, be intentionally disengaged by merely positioning the reel so that the edges 62 and 63 are facing downwardly, at which point the device will become disengaged under the force of gravity.

When the film 50 has been spooled upon the reel 54, the same may be projected in the normal manner. When the end of the film is reached, the tension exerted by the driving claws of the projector (not shown) will be sufficient to overcome the tension exerted by the member 32, at which point the film 50 will become disengaged from the device. No damage occurs to either the end 52 of the film 50 or the device 10, and when the entire length of the film 50 has passed through the projector it may be reengaged with the device so that the respooling operation may be repeated.

Should the device 10 be accidentally damaged, owing to improper handling, it may be readily reshaped between the fingers of the user, to be used again many times. The tension exerted by the tension member 32 may be also adjusted by bending the same upwardly or downwardly, as shown on Figure 3, as the individual case requires.

It may thus be seen that I have invented novel and highly useful improvements in means for engaging motion picture film ends with the core or central portion of a projection reel. The device is simple to use, substantially indestructible, and may be produced at a very low cost of manufacture. By means of the device, the time required and difficulty normally encountered in rethreading the conventional motion picture reel are both substantially reduced. No damage results by the use of the device to either the film or the reel with which the device is engaged. The device is easily disengaged from either the film or the reel when required, but accidental disengagement between either of the same does not occur in normal usage.

I wish it to be understood that I do not consider the invention limited to the exact details of structure shown and set forth in this specification, for obvious modifications will occur to those skilled in the art to which the present invention pertains.

I claim:

1. Means for engaging motion picture film ends with a reel therefor comprising: a main body element, a film clip element and a reel engagement element; said film clip element being resiliently engageable with the end of said film, said reel engagement element being engageable with a slot in the core of said reel; said main body element including a pair of alignment members adapted to be disposed between the flanges of said reel; said main body element and said film clip element having a substantially arcuate configuration to correspond to the cylindrical configuration of the core of said reel.

2. Means for engaging motion picture film ends with a reel therefor comprising: a main body element, a film clip element and a reel engagement element; said film clip element being resiliently engageable with the end of said film, said reel engagement element being engageable with a slot in the core of said reel; said main body element including a pair of alignment members adapted to be disposed between the flanges of said reel and in contact with the outer surface of the core of said reel; said main body element and film clip element being curved to form a substantially arcuate configuration; said reel engagement element being disposed on the concave side of said main body element.

3. Means for engaging motion picture film ends with a reel therefor comprising: a main body element, a film clip element and a reel engagement element; said film clip element being resiliently engageable with the end of said film, said reel engagement element being engageable within a slot in the core of said reel; said main body element including a pair of alignment members adapted to be disposed between the flanges of said reel and in contact with the outer surface of the core of said reel; said film clip element including a tension member serving to compress the end of said film between itself and said alignment members; said reel engagement element extending outwardly from the plane of said main body element and having a plurality of offset portions forming at least one recessed portion on each side thereof; said recessed portions being alternately engageable with the edges of said slot in the core of said reel.

4. In combination, a motion picture film reel having a central core, and means for engaging motion picture film ends with said core; said means including a main body element, a film clip element and a reel engagement element; said film clip element being resiliently engageable with the end of said film, said reel engagement element being engageable with a slot in the core of said reel; said main body element including a pair of alignment members adapted to be disposed between the flanges of said reel; said main body element and said film clip element having a substantially arcuate configuration to correspond to the cylindrical configuration of the core of said reel.

5. A combination film reel and means for engaging motion picture film ends with said reel; said means including a main body element, a film clip element and a reel engagement element; said film clip element being resiliently engageable with the end of said film, said reel engagement element being engageable with a slot in the core of said reel; said main body element including a pair of alignment members adapted to be disposed between the flanges of said reel and in contact with the outer surface of the core of said reel; said reel engagement element being disposed on the concave side of said main body element.

6. A combination motion picture film reel and means for engaging motion picture film ends with the central core of said reel; said means including a main body element, a film clip element and a reel engagement element; said film clip element being resiliently engageable with the end of said film, said reel engagement element being engageable within a slot in the core of said reel; said main body element including a pair of alignment members adapted to be disposed between the flanges of said reel and in contact with the outer surfaces of the core of said reel; said film clip element including a tension member serving to compress the end of said film between itself and said alignment members; said reel engagement element extending outwardly from the plane of said main body element and having a plurality of offset portions forming at least one recessed portion on each side thereof; said recessed portions being alternately engageable with the edges of said slot in the core of said reel.

References Cited in the file of this patent

UNITED STATES PATENTS

| Number | Name | Date |
| --- | --- | --- |
| 929,380 | Blacknall | July 27, 1909 |
| 930,327 | Wheeler | Aug. 3, 1909 |
| 1,204,827 | Schroeder | Nov. 14, 1916 |
| 1,478,408 | Tuttle | Dec. 25, 1923 |
| 1,901,949 | Clark | Mar. 21, 1933 |
| 1,993,558 | Marchev et al. | Mar. 5, 1935 |
| 2,209,318 | Caldwell | July 30, 1940 |